Dec. 23, 1930.   P. H. HASELTON ET AL   1,786,013
SUPERVISORY MECHANISM
Filed Nov. 28, 1927

Inventors
Philip H. Haselton
Malcolm A. Jenckes
By their Attorneys
Cooper, Kerr & Dunham Patented Dec. 23, 1930

1,786,013

UNITED STATES PATENT OFFICE

PHILIP H. HASELTON, OF EAST ORANGE, NEW JERSEY, AND MALCOLM A. JENCKES, OF PROVIDENCE, RHODE ISLAND, ASSIGNORS TO DETEX WATCHCLOCK CORPORATION, OF NEW YORK, N. Y., A CORPORATION OF DELAWARE

SUPERVISORY MECHANISM

Application filed November 28, 1927. Serial No. 236,151.

This invention relates to a supervisory mechanism for preventing the use of a recording instrument when the position of a device which is being reported upon by the use of the recording instrument is in other than normal desired position. The supervisory mechanism is well adapted for use with a valve and in connection with automatic sprinkler systems. Because of the desirability of knowing whether such a valve is open or shut, watchmen are employed for inspecting the same and it has been proposed that a watchman carry a recording clock adapted to be affected by a recording instrument associated with a valve. The proposed scheme necessitates that the recording instrument at the valve be ordinarily arranged so that a watchman would be unable to produce a record if the valve be in a closed position or partly closed position, and under such conditions the recording instrument at the valve would be maintained inaccessible.

Since the record carried by a recording clock conveys a definite story indicating the diligence of the watchman and/or the condition of the valves when used in carrying out the scheme above outlined, it becomes necessary to have supervisory mechanisms at the valves which cannot be tampered with and which will function with absolute certainty.

Among the objects of this invention is to provide a supervisory mechanism of a simple construction, devoid of a large number of parts and yet dependable for certainty in performance of its function while not being subject to wrongful undetectable manipulation.

Other objects appear hereinafter in the detailed description and claims.

Figure 1:
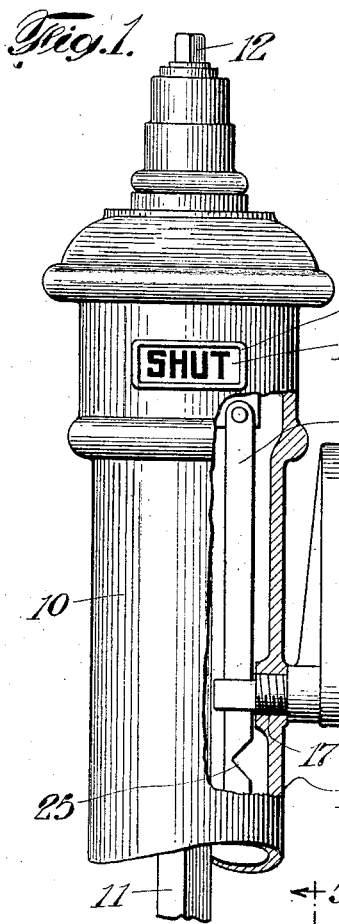
Fig. 1 illustrates a supervisory mechanism associated with an indicator post or yard valve.

The supervisory mechanism is illustrated in conjunction with an indicator post valve of a type which is used to control the flow of water to an automatic sprinkler system. This type of post is well known, and only so much of one is illustrated as to assist in presenting a full disclosure of the invention. In general, the indicator post valve comprises a casing 10, Fig. 1, in which is disposed a vertically extending stem 11, which by its rotary movement controls the position of a valve gate, not shown. For the operation of the valve, a handle or hand wheel is applied to the nut 12. The rotation of the nut 12 causes rotation of the stem 11 accompanied by a closing or opening movement of the valve gate. Target 13 is caused to travel in a vertical path upon rotation of stem 11, and the words "Open" and "Shut" indicate the condition of the valve through the sight opening 14. With the valve illustrated, when the target is in a raised position the legend "Open" will appear at the window or sight opening 14, and when the target is in a lower position, the valve will be closed and the legend "Shut" will appear at the window 14.

Figure 2:
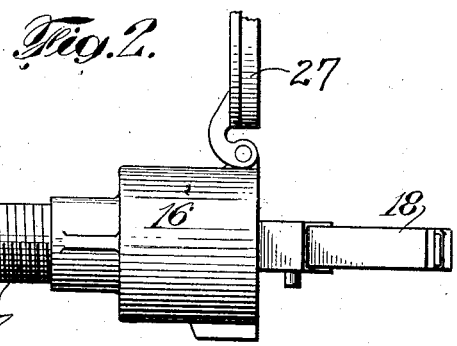
Fig. 2 is a plan view of the supervisory mechanism with the recording instrument in an accessible position.
Figure 3:
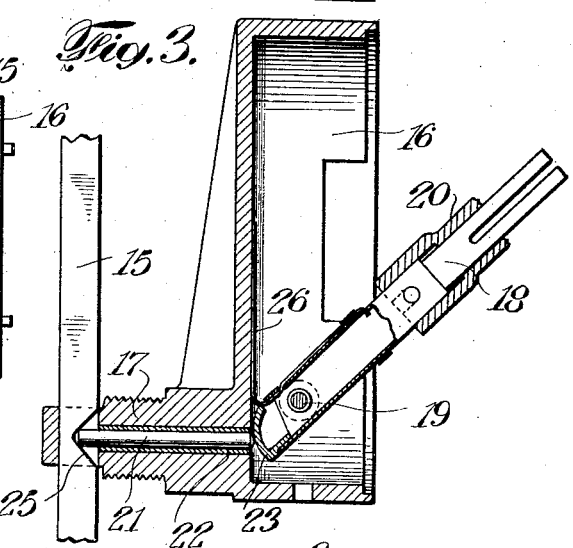
Fig. 3 is a sectional elevation on the line 3—3 of Fig. 5. The supervisory mechanism is shown with the recording instrument in the same position as illustrated in Fig. 2.
Figure 4:
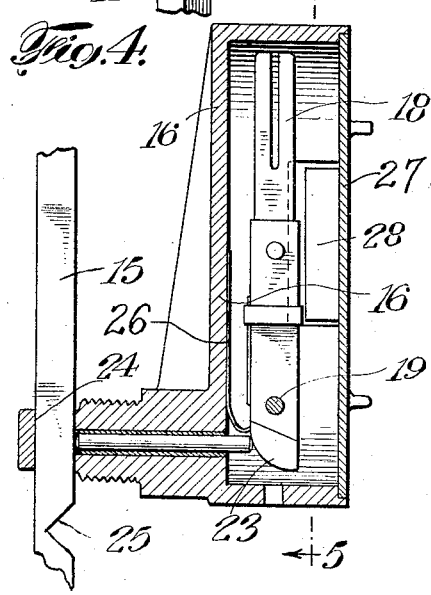
Fig. 4 is a sectional elevation of the supervisory mechanism showing the recording instrument within a housing and inaccessible.
Figure 5:
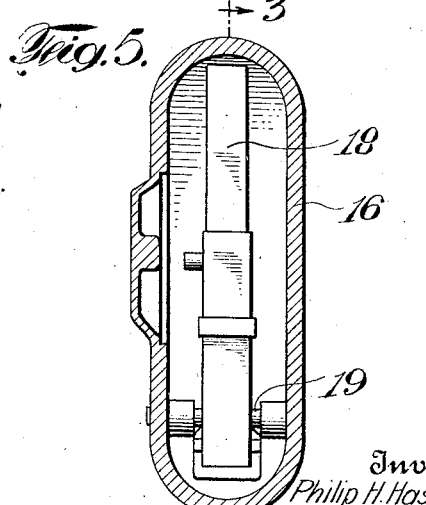
Fig. 5 is a sectional view on the line 5—5 of Fig. 4.

The supervisory mechanism comprising the present invention comprises a housing 16 for enclosing and rendering inaccessible a recording instrument or key when the valve is in other than a normal desired position. This housing may be a casting having as an integral part thereof, a boss 17 extending from the rear side of the housing. This boss 17 has a portion thereof which is threaded and which is intended to fit within a tapped hole in the casing 10 of the indicator post. The recording instrument or key 18 which forms a part of the supervisory mechanism, is pivotally mounted within said housing upon a shaft 19, journaled at opposite sides of the housing 16. The shaft is close to one end of the recording instrument 18 and the other or working end of the recording instrument may be withdrawn from within the housing so as to be accessible for recording purposes. The position of accessibility of this recording instrument is illustrated in Figs. 2 and 3. In this position the socket portion 20 of a watchman's recording clock (not shown) may be fitted over the working end of the recording instrument 18 so that the recording instrument may be caused to function to make a record upon the card carried by the recording clock. The form of recording instrument which we prefer to use is described in United States reissue Letters Patent No. 14,193, but it is contemplated that any similar kind of recording instrument may be used. The proportions of the parts are such that when the recording instrument 18 is within the housing 16, as illustrated in Fig. 4, the working end of the recording instrument is inaccessible for recording purposes.

It is recognized that in mechanisms of the character of the present invention it is desirable that the recording instrument be maintained inaccessible at all times when the valve is out of its fully open position and likewise that the recording instrument be accessible for performing its operating functions when the valve is fully open. For accomplishing these conditions we have provided means which will control the recording instrument with absolute certainty and precision. These means comprise a plunger 21 which is loosely mounted within a passage 22, in order that it may be moved freely in an axial direction. This passage 22 communicates with the housing 16 and with the inside of casing 10. The casing end of the plunger 21 is adapted to coact against an edge of rod 15 and the housing end of the plunger is adapted to coact with a rounded abutment 23 at the lower end of the recording instrument. The rod 15 is enclosed within casing 10 and is connected to the target 13. Its position is directly dependent upon the position of the valve and it is guided in a vertical path by means of a hole 24 at the casing end of boss 17. Hence when the valve is closed, the rod 15 will be in a low position and the edge of rod 15 will maintain the plunger in the position illustrated in Fig. 4. In this position the housing end of the plunger 21 extends within the housing 16 and bears against the rounded abutment 23 of the recording instrument so as to maintain the recording instrument entirely within the housing. Until the position of the valve is changed, the recording instrument will be maintained in this inaccessible position. When a watchman is making his rounds and stops at the particular indicator post for the purpose of taking a record of its open condition, he will be unable to do so unless he opens the valve. In opening the valve, rod 15 will be raised until the valve is open at which position the notch 25 is opposite the casing end of the plunger. In this position it is possible to make use of the recording instrument because the plunger is enabled to be moved to the left and the recording instrument is free to move to the position illustrated in Fig. 3. When the housing is used in the position illustrated in the drawings, the weight of the upper or working end of the recording instrument will probably be sufficient to move the plunger 21.

However, should the housing be in a position inverted in respect to the position illustrated it might be desirable to make use of means such as a spring 26 for the purpose of assisting the outward movement of the recording instrument. The housing is provided with a door 27 having a lock 28 for maintaining the door closed. The key to this lock would be in possession of a watchman and unauthorized persons would not be able to tamper with the recording instrument.

It is worthy of mention that the elements which control the position of the recording key are entirely enclosed and remain so once the supervisory mechanism is affixed to a valve post. Not only does this expedient afford protection to these elements, but it also prevents unauthorized tampering.

We do not restrict ourselves unessentially in the foregoing description, but contemplate such changes and modifications within the scope of the appended claims as may be found to be advisable.

It is clear that the number of notches or size of notch may be varied to permit the use of the recording instrument under different conditions so as to fulfill different requirements, and that the notch and controlling edge of the rod 15 may be arranged in relation to one another for accommodating any direction of movement of the target or other motion transferring element.

What we claim is—

1. A supervisory mechanism for use in conjunction with a valve provided with a casing enclosing a stem for controlling the position of a valve gate comprising, a housing, a recording key pivotally mounted within said housing, said recording key being capable of swinging in an arc about its pivot from a position in which the working end of the recording key is inaccessible within said housing to a position of accessibility of the working end of the recording key from outside of said housing, a rod having connections with the stem, said rod being enclosed within the casing, and means adapted to coact with said rod and with said key for maintaining said key within said housing when said rod is in predetermined position.

2. A supervisory mechanism for use in conjunction with a valve provided with a casing enclosing a stem for controlling the position of a valve gate comprising, a rod having connections with said valve stem and movable thereby, said rod being enclosed within the casing, a housing having a connecting portion extending to and engaging with the casing, a recording key of a length to render it inaccessible for useful purposes when within said housing, said key being pivotally mounted within the housing, and means intermediate said key and said rod for maintaining said key within said housing for certain positions of the valve gate, said means being always inaccessible and extending through the connecting portion between the housing and casing.

3. A supervisory mechanism for use in conjunction with a valve provided with a casing enclosing a stem for controlling the position of a valve gate comprising, a housing, a recording key pivotally mounted within said housing so that the working end of said key may be maintained inaccessible within said housing or may be withdrawn from said housing for useful operation, and means for controlling the position of said recording key, said means including a rod and a plunger mounted for axial movement, one end of said plunger abutting said rod and the other end of said plunger abutting an end of said recording key when said key is maintained inaccessible within said housing, said rod having a notch for permitting said plunger to enter whereby said key is permitted to be accessible for use outside of said housing.

4. A supervisory mechanism for use in conjunction with a valve provide with a casing enclosing a valve stem for controlling the position of a valve gate comprising, a housing supported by the casing, a recording key pivotally mounted within said housing, a passage extending from said housing to the casing, a rod having connections with the valve stem and extending opposite the casing end of said passage, and a plunger disposed in said passage and of such a length as to contact said rod and said recording key for keeping said recording key inaccessible within said housing when said rod is in predetermined position.

5. A supervisory mechanism for use in conjunction with a valve provided with a casing enclosing a valve stem for controlling the position of a valve gate comprising, a housing, a recording key mounted within said housing and having one end removable from within said housing for recording purposes, means for pivotally supporting said key in relation with said housing, a plunger disposed in a passage connecting said housing with the casing, a rod having connections with the stem, said rod being restricted to translatory movement, and a notch in said rod for accommodating the casing end of said plunger when the rod is in a definite position, said recording key being free to extend from said housing when the notch is opposite said plunger.

6. A supervisory mechanism for use in conjunction with a valve provided with a casing enclosing a stem for controlling the position of a valve gate comprising, a housing having a threaded boss extending therefrom and adapted to engage with said casing, said housing being boxlike and having at least one side open, bearings at opposite sides of said housing, a shaft supported in said bearings at opposite sides of said housing, a shaft supported in said bearings, a recording key mounted upon said shaft, a plunger disposed within a passage in said boss, and a rod having connections with said stem and guided for translatory movement adjacent the casing end of said passage, said rod having a notch therein which is so disposed as to be opposite the end of said plunger when the valve gate is in a predetermined position, the unnotched portion of the rod serving to maintain said plunger in contact with one end of said recording key whereby the recording key is maintained inaccessible within said housing when the valve gate is in other than said predetermined position.

In testimony whereof we hereto affix our signatures.

PHILIP H. HASELTON.
MALCOLM A. JENCKES.